Figure 1:
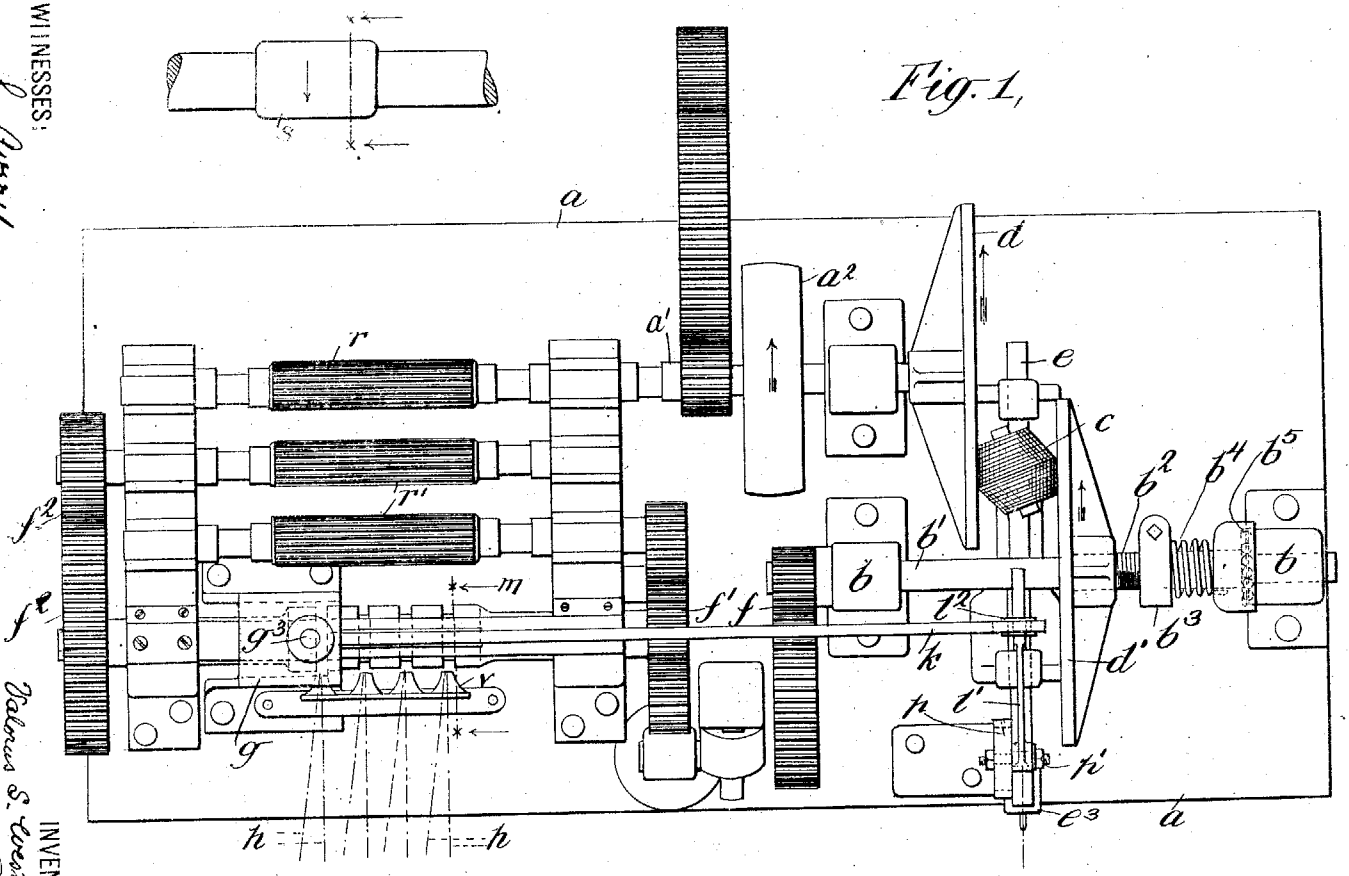

No. 12,478. REISSUED MAY 8, 1906.

V. S. WESTCOTT & F. W. POTTER.

SLIVER EVENING DEVICE FOR DRAWING FRAMES.

APPLICATION FILED MAR. 23, 1906.

3 SHEETS—SHEET 1

WITNESSES:

May S. Avery.

R. W. Ashley.

INVENTORS

Valorus S. Westcott

Frank W. Potter

BY

Charles D. Jones

Their ATTORNEY

No. 12,478. REISSUED MAY 8, 1906.
V. S. WESTCOTT & F. W. POTTER.
SLIVER EVENING DEVICE FOR DRAWING FRAMES.
APPLICATION FILED MAR. 23, 1906.
3 SHEETS—SHEET 2.
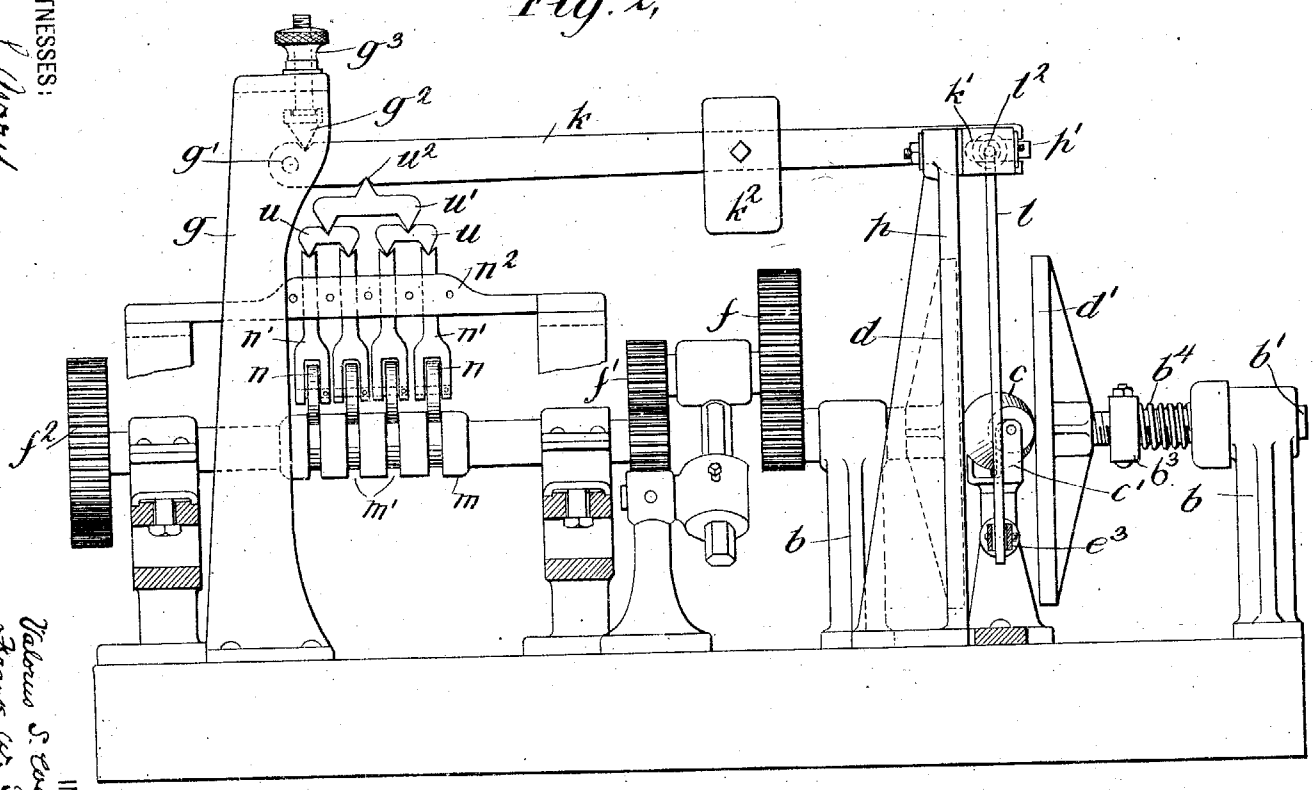
WITNESSES:
May L. Avery.
R. W. Ashley
INVENTORS
Valorus S. Westcott
Frank W. Potter
BY
Charles A. Jones
Their ATTORNEY No. 12,478. REISSUED MAY 8, 1906.
V. S. WESTCOTT & F. W. POTTER.
SLIVER EVENING DEVICE FOR DRAWING FRAMES.
APPLICATION FILED MAR. 23, 1906.
3 SHEETS—SHEET 3.
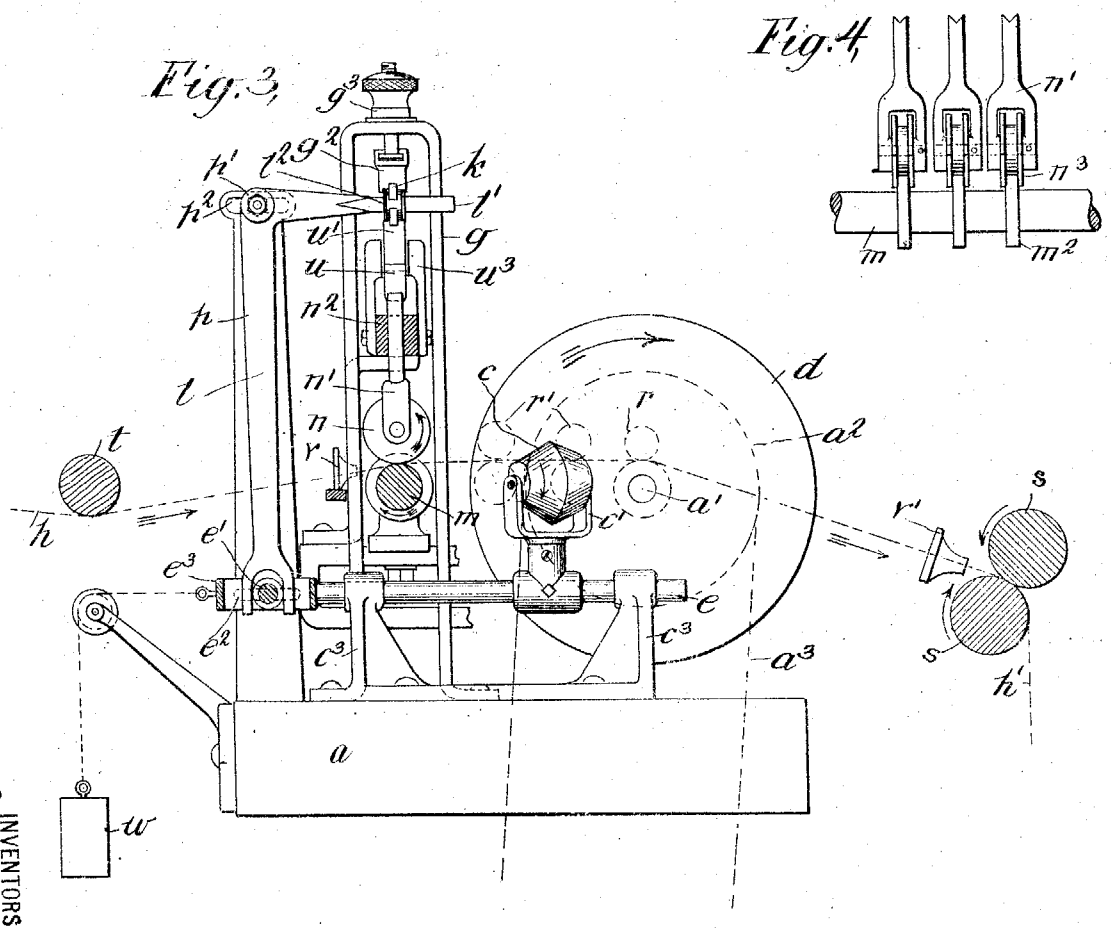
WITNESSES:
May L. Avery.
Geo. Ashley
INVENTORS
Valorus S. Westcott
Frank W. Potter
BY
Charles D. Jones.
Their ATTORNEY

UNITED STATES PATENT OFFICE.

VALORUS S. WESTCOTT, OF PAWTUCKET, AND FRANK W. POTTER, OF CENTRAL FALLS, RHODE ISLAND.

SLIVER-EVENING DEVICE FOR DRAWING-FRAMES.

No. 12,478. Specification of Reissued Letters Patent. Reissued May 8, 1906.

Original No. 786,242, dated March 28, 1905. Application for reissue filed March 23, 1906. Serial No. 307,745.

*To all whom it may concern:*

Be it known that we, VALORUS S. WESTCOTT, a resident of Pawtucket, and FRANK W. POTTER, a resident of Central Falls, in the county of Providence and State of Rhode Island, citizens of the United States of America, have invented certain new and useful Improvements in Sliver-Evening Devices for Drawing-Frames, of which the following is a specification.

Our invention relates to certain improvements in sliver-evening devices for drawing-frames and kindred machines; and it consists in the novel construction and combination of parts hereinafter set forth and claimed.

The object we have in view is to produce an "evener," so called, possessing a greater degree of efficiency and capable of being actuated with less power than devices of this class as usually constructed.

By means of our invention the work or output is materially increased, the sliver produced being at the same time more uniform or homogeneous throughout. These advantageous results are attained through the medium of the instrumentalities forming the subject of the present application for Letters Patent.

In the accompanying three sheets of drawings, Figure 1 is a plan view of a drawing-frame provided with our improvements, some of the minor details being omitted. Fig. 2 is a corresponding side elevation. Fig. 3 is an end view, in partial transverse section, some of the driving mechanism, &c., being omitted, the plane of said section being taken on lines $x$ $x$ of Fig. 1; and Fig. 4 is a side view showing a modified form of the evener-roll and the fellow rolls or wheels coöperating therewith.

It may be stated that in railway-heads or drawing-frames as usually constructed the sliver-evening operation is effected at the front side of the head—that is, intermediate the front drawing-rolls and the calender-rolls. In our invention we employ evener-rolls located at the back of the drawing-rolls, whereby any appreciable variations in the thickness of the moving slivers operates through the novel device to automatically change the speed of the back drawing-rolls slower or faster, as the case may require, thereby delivering the sliver to the positively-driven front and calender rolls in a uniform manner.

In carrying out our invention the front drawing-rolls $r$ and calender-rolls $s$ of the drawing-frame may be mounted and driven in any well-known way. In the drawings herewith the said rolls $r$ are rotated by a shaft $a'$, adapted to run at a uniform rate of speed by a belt $a^3$, driving a pulley $a^2$, secured to said shaft, the calender-rolls being positively driven by means of gearing, &c., as usual. The said rolls $r$, shaft $a'$, &c., and also the back drawing-rolls $r'$ and evener-roll $m$ are mounted in suitable bearings secured to a base or table $a$, as clearly shown. To the front end of said shaft $a'$ is secured a driving-disk $d$, from which power is transmitted through an interposed friction-wheel $c$ to an oppositely-disposed friction-disk $d'$, secured to a yielding or endwise-movable shaft $b'$, revolubly mounted in bearings $b$ $b$. The said rolls $r'$ and $m$ are driven by means of suitably-arranged gear-trains $f$, $f'$, and $f^2$, connected therewith and with the variably-driven shaft $b'$. (See Fig. 1.)

We prefer to provide the shaft $b'$ with a thrust-bearing having antifriction-balls $b^5$, a screw-threaded portion $b^2$, a nut $b^3$, movably fitted to said thread, and a helical spring $b^4$, interposed between said nut and thrust-bearing. By means of this arrangement the degree of frictional contact between the wheel $c$ and disk $d'$ may be controlled as desired.

It is obvious that the speed ratio of the disk $d'$ to the driving-disk $d$ is governed by the relative position thereto of the small friction-wheel $c$—that is to say, if the axis of the latter be moved toward the uniformly-revolving driving-shaft $a'$ the speed of disk $d'$ will be correspondingly reduced, and if it be moved in the opposite direction or toward the driven shaft $b'$ the speed will be increased. This principle of operation is utilized to change the speed of the back drawing-rolls $r'$ and the evener-roll $m$ when variations occur in the normal thickness of the traveling slivers $h$. For example, when the sliver exceeds the normal thickness the speed of said rolls should be correspondingly decreased and, conversely, the speed increased when the sliver is less than the normal thickness. In order to automatically effect such change in the speed of the said sliver-operating rolls, the friction-wheel $c$ is revolubly mounted in a yoke $c'$, Fig. 3, adjustably secured to an endwise-movable horizontal rod $e$, supported in fixed bearings $c^3$, the rear end portion $e^3$ of the rod being slotted longitudinally at $e^2$ and carrying a roll $e'$ and counterweight $w$. Contiguous to the rear end of the rod is secured a standard $p$, its upper end being slotted in $p^2$ to receive a pin or fulcrum $p'$, on which is pivoted the bell-crank lever $l$, the lower end of which latter is yoked to receive said roll $e'$. The horizontal arm $l'$ of the lever is provided with a small slidable flanged wheel $l^2$, all as clearly shown. Thus it is clear that upon vibrating the arm $l'$ the part $l$ will simultaneously move the rod and its friction-wheel $c$ forward or backward as the said arm is raised above or depressed below the horizontal or normal position. The distance thus traversed by the wheel corresponds to the ratio of the two members of the lever.

Another feature of our invention resides in the novel construction of the evener-roll $m$, combined with equalizing means for transmitting any variations in the thickness of the slivers $h$ to the said wheel-controlling lever $l$. The evener-roll $m$ is located at the rear of the back drawing-rolls $r'$ and is provided with a number of series of concentric peripheral grooves $m'$, adapted to receive the several slivers. A small independent wheel or disk $n$ is mounted to turn freely in each groove, its periphery being arranged to bear directly upon the sliver passing between it and the bottom of the groove. A light vertically-movable yoke $n'$ has the wheel $n$ journaled therein, the upper end of the yoke being adapted to form a seat or fulcrum for the small knife-edged saddle $u$, the latter in turn constituting a fulcrum for the upper and larger saddle $u'$ and being in engagement with the under side of the horizontal equalizing-lever $k$, thus forming a live fulcrum $u^2$, as clearly shown in Fig. 2. The said lever $k$ extends into the upper end of a hollow standard $g$ and is pivoted or fulcrumed therein at $g^2$, a screw and nut $g^3$ being employed for effecting an accurate adjustment of the parts. The lever is kept in position laterally by means of integral lugs $g'$. The outer or free end $k'$ of the lever is slotted to receive the said flanged wheel $l^2$ of the bell-crank lever $l$. The said yokes $n'$ are vertically guided in a fixed bar or member $n^2$, to the opposite sides of which are secured upwardly-extending cheeks $u^3$, Fig. 3, adapted to maintain said saddle members $u$ $u'$ in position laterally.

From the foregoing it will be apparent that any variation in the thickness of the sliver $h$, passing from the tension-roll $t$ to and between the grooved portion $m'$ of the evener-roll and the corresponding disks $n$, previously adjusted or weighted to the work or output, as desired, will be greatly mutliplied through the medium of the compound levers employed, thereby automatically changing the position of the continuously-revolving friction-wheel $c$ a corresponding extent and causing the evener and drawing rolls $m$ $r'$, respectively, to revolve slower or faster, as the case may be, with respect to the uniformly-revolving front drawing-rolls $r$ and calender-rolls $s$, the result being to automatically slacken the speed of rolls $m$ and $r'$ in case the sliver becomes temporarily thicker than normal, thereby in the meantime permitting the faster-revolving front rolls $r$ to draw the sliver down to the normal thickness, and thus feed a practically uniform quantity of sliver or material to the calender-rolls at all times. In case the sliver is of less thickness than normal when it enters the evener-roll the mechanism automatically acts to quicken the speed of said rolls $m$ and $r'$ in excess of that of the front rolls, so that the amount or quantity of material entering the rolls $r$ and $s$ is substantially the same in any event.

In lieu of the grooved roll $m$ and wheels $n$ the former may be provided with a corresponding number of concentric peripheral projecting ribs $m^2$, Fig. 4, each having an independently-mounted vertically-movable freely-turning flanged wheel $n^3$ engaging therewith, the sliver in this case passing between the adjacent surfaces, substantially as before described with respect to the grooves $m'$ and disks $n$.

Each pair of slivers $h$, passing from the rear tension-roll $t$, may be combined to form a single sliver, each of which latter is in turn drawn through a stationary trumpet $v$, which guides it to the respective groove of roll $m$. The several slivers pass from said roll to and between the rear drawing-rolls $r'$ and then to the front drawing-rolls $r$, the sliver issuing from the latter rolls then being practically a single one having a greater width than the initial or normal sliver. The sliver next in passing through the front stationary trumpet $v'$ and calender-rolls $s$ is somewhat contracted and compressed or condensed, the action of the latter rolls being substantially as common in producing the discharged sliver $h'$.

We may add that in order to counteract the tendency of the revolving driving-disks $d$ $d'$ to advance the friction-wheel $c$ and its supporting-rod $e$ a suitable-mounted counter-weight $w$ is attached to the rear end $e^3$ of the rod, as clearly shown in Fig. 3.

A feature of importance in connection with the present invention is that the sliver as it passes through the evener-roll $m$ is at all times confined on all sides. It results from this that whenever there is any variation of the sliver from a normal thickness the yieldingly-mounted roll $n$, which may properly be termed a "detector," will immediately respond, moving up or down, according as to whether there is an increase or decrease in the thickness of the sliver, and although the sliver is confined an all sides it can yield in one direction only. If a sliver should enter one of the grooves of roll *m* in a normal vertical thickness but of greater lateral thickness the side walls of the groove will cause the sliver to increase in vertical thickness, thus moving the detector to effect the desired change in the speed of rotation of the evener-roll *n* and the back drawing-rolls. In other words, the detector responds to any variation from a normal thickness whether in a vertical or transverse direction

We claim as our invention and desire to secure by United States Letters Patent—

1. In a sliver-evening device for drawing-frames, having front or delivery drawing-rolls, driving mechanism for revolving them at a substantially uniform rate of speed, and rear rolls *r'* for feeding a plurality of independent slivers between them to said front rolls, the combination therewith of sliver-evening mechanism comprising a revoluble evener-roll *m*, a revoluble yieldingly-mounted wheel for each sliver, said wheel being actuated by said roll *m*, variable driving means taking its motion from the said front driving mechanism for rotating the said rear and evener rolls, and an automatic equalizing device having its movements controlled by variations in the thickness of any one of the slivers while the latter are passing between the said evener-roll and wheels.

2. In a drawing-frame having front drawing-rolls and mechanism for rotating them at a uniform or invariable rate of speed, said mechanism including a driving-disk *d* revolving in unison with the same, the combination therewith of a plurality of pairs of rear rolls which deliver the slivers to said front drawing-rolls, a yieldingly-mounted oppositely-disposed fellow disk *d'* revoluble in the same direction as the said driving-disk, a freely-turning bevel-faced wheel *c* interposed between and in frictional engagement with the working faces of both the said disks, an evener-roll and revoluble independent wheels *n* coacting therewith, between the adjacent peripheral surfaces of which the slivers pass to the said rear rolls, means connected with the disk *d'* for rotating said evener and rear rolls, and a device operatively connected with said revoluble members *c* and *n* for automatically changing the speed of said rolls, substantially as hereinbefore described and for the purpose set forth.

3. In a drawing-frame, the combination with the front drawing-rolls and driving mechanism therefor arranged to revolve them at a uniform rate of speed, of a plurality of pairs of rear rolls between which the sliver passes, means for revolving said rear rolls, said means being operatively driven by the first-named driving mechanism, and suitably-mounted compound or multiple levers adapted in their movements to automatically change the speed of the said mechanism which rotates the rear rolls, one of the latter rolls being provided with a guided and weighted freely-turning wheel for each sliver, whereby variations in the thickness of the slivers while passing between the adjacent peripheral surfaces of said roll and wheels cause the levers and connected mechanism to become operative.

4. In a sliver-evening device for drawing-frames, the combination with the evener-roll *m* and mechanism adapted for driving the same at variable rates of speed, of a plurality of independent freely-turning yieldingly-mounted wheels between the peripheral surfaces of which and the said roll the slivers pass, and a speed-changing device operatively connected with said wheels and with the roll-driving mechanism for automatically changing the speed of rotation of the roll, slower or faster as the case may be, whenever the thickness of any of the passing slivers varies from the normal.

5. In a drawing-frame provided with uniformly-driven front drawing-rolls between which the slivers pass, and rear sliver-feeding rolls adapted to be driven at varying rates of speed, the combination therewith of a friction driving-disk *d* revolving in unison with said first-named rolls, a spring-pressed endwise-movable revoluble fellow disk *d'* oppositely disposed with respect to said disk *d*, said two disks being arranged to turn in one direction, a freely-revoluble wheel *c* interposed between and in continuous frictional engagement with the working faces of both disks, and means including independent yieldingly-mounted disks *n* arranged with respect to said rear rolls and operatively connected with the wheel *c*, whereby variations in the thickness of the passing slivers, greater or less than the normal thickness, causes the said wheel to be automatically advanced or retracted, thereby respectively decreasing or increasing the speed of the rear rolls, substantially as described.

6. In a sliver-evening mechanism, means for feeding the sliver, a detector device having members movable relative to each other the movable member thereof being adapted to rest or bear directly on the sliver, and means to change the rate of feed of the sliver said means being actuated by the detector device when the sliver varies in thickness.

7. In a sliver-evening device, means for equalizing the varying thickness of the sliver, said means consisting of a detector having two members, one vertically fixed and one vertically movable, said movable member resting or bearing directly upon the sliver, and means actuated by said movable member to change the rate of feed of said sliver when required.

8. In a sliver-evening mechanism, means for feeding the sliver, a detector device having two rotating members, means to change the rate of feed of the sliver, said means being actuated by the detector device when the sliver varies in thickness.

9. In a sliver-evening device, the combination of means for confining the sliver, a movable detector at all times resting or bearing on said sliver, and adapted to be moved when the sliver varies in thickness, and means actuated by the movement of the detector to vary the rate of feed of the sliver.

10. In a sliver-evening device, the combination of means to feed the sliver, a rotary detector adapted to be moved by the varying size of said sliver, and means actuated by movements of said detector to change the rate of feed of the sliver.

11. A sliver-evening device comprising relatively fixed and movable members between which the sliver is at all times confined on all sides, and means actuated by said movable member when the sliver varies from a normal thickness to vary the rate of feed of the sliver.

12. A sliver-evening device comprising two members movable relative to each other for confining the sliver on all sides at all times, and means actuated by the movement of one of said members upon a variation in thickness of the sliver from a normal to correspondingly vary the rate of feed of the sliver.

13. A sliver-evening device comprising members movable relative to each other one of said members being grooved and the other fitting therein whereby the sliver is confined on all sides at all times, and means actuated by the movement of one of said members when the sliver varies from a normal thickness to vary the rate of feed of the sliver.

14. In a sliver-evening device the combination of means for confining a sliver on all sides comprising a detector bearing upon and adapted to be moved by the sliver when it varies from a normal thickness, and means actuated by the movement of the detector to vary the rate of feed of the sliver.

15. In a sliver-evening device the combination of means for confining a sliver on all sides comprising a yieldingly-mounted detector, and means actuated by the movement of the detector when the sliver varies from a normal thickness to correspondingly vary the rate of feed of the sliver.

16. In a sliver-evening device the combination of a member having a groove therein in which the sliver is confined laterally, a detector resting within said groove and adapted to bear upon the sliver, and means actuated by the movement of the detector when the sliver varies from a normal thickness to vary the rate of feed of the sliver.

17. In a sliver-evening device the combination of means to unyieldingly confine a sliver in one direction, a movable detector adapted to bear upon the sliver and operating in a plane transverse to the plane of fixed confinement, and means actuated by the movement of the detector when the sliver varies from a normal thickness to vary the rate of feed of the sliver.

18. In a sliver-evening device the combination of a roll having a groove therein, means to rotate said roll, a detector seated within the groove and coacting with the roll to confine the sliver on all sides, and means actuated by the movement of said detector when the sliver varies form normal thickness to vary the speed of rotation of said roll.

19. In a sliver-evening device the combination of a roll having a groove therein, a detector consisting of a rotatable disk seated within said groove and mounted so as to yield upon a variation of the sliver from a normal thickness, and means actuated by the movement of said detector to vary the rate of feed of the sliver.

20. In a drawing-frame the combination of drawing-rolls, an evener-roll, all of said rolls being geared together, a detector adapted to bear upon the sliver, and means actuated by the movement of said detector upon a variation of the sliver from a normal thickness to vary the speed of said rolls.

21. In a drawing-frame the combination of front drawing-rolls and means to rotate the same at a uniform rate of speed, back drawing-rolls, an evener-roll, said back rolls and evener-roll being geared together, a detector coacting with said evener-roll to confine the sliver on all sides, and means actuated by the movement of said detector upon the variation of the sliver from a normal thickness to vary the speed of said back drawing-rolls and evener-roll.

In testimony whereof we have hereunto signed our names in the presence of two subscribing witnesses.

VALORUS S. WESTCOTT.
FRANK W. POTTER.

Witnesses:
CHAS. H. HYDE,
HENRY MCINTYRE.